United States Patent Office 3,235,451
Patented Feb. 15, 1966

3,235,451
SILICA POWDER INSECTICIDE WITH GLYCOLS
TO REDUCE DUSTINESS
John Franz Odeneal, New York, N.Y., assignor to FMC
Corporation, New York, N.Y., a corporation of Delaware
No Drawing. Filed Mar. 12, 1962, Ser. No. 179,188
5 Claims. (Cl. 167—42)

This invention relates to means for controlling crawling insects, and particularly to compositions based on finely divided sorptive silicas. It aims to provide a composition of this type which in effect combines the advantages of very fine highly sorptive particles in a dustless composition.

Many investigators have reported the fact that certain finely divided carriers used in formulation of insecticides have enhanced the effectiveness of the said insecticides. It was early disclosed that carriers which were highly sorptive of water had this effect. More recently, investigators have determined that the effect is enhanced where the carrier has abrasive properties in addition to water sorptive properties. The carriers found most effective have been the finely divided silicas such as silica gels and silica aerogels, which have average particle size of the order of a few microns and rather low bulk densities. One such preparation which has been extensively investigated is sold under the trade name Dri-Die 67. It comprises silica gel impregnated with a small amount, of the order of 5%, of ammonium fluosilicate and with an average particle size of about 3 microns.

Even this coated silica, however, has the disadvantage of being extremely dusty; and while it adheres well to insects' bodies, it does not adhere well to surfaces to which it is applied. As a result, it is a nuisance in the home, and in addition is exhausted rapidly by the insects.

These finely divided silicas can be improved by the addition of known insecticides, but here again the problem is that the products remain extremely dusty and do not adhere well to surfaces. Even when a liquid insecticide such as a pyrethrin extract in kerosine, fortified with piperonyl butoxide, is used, the resultant mixtures remain extremely dusty and difficult to handle, and lack adhesion to surfaces.

If the materials are coated with adhesives to reduce their dustiness and improve the adhesion, a marked diminution in effectivness is generally obtained when the adhesives are used in concentrations sufficient to improve the adhesion and reduce the dustiness. Apparently the typical adhesive tends to coat the silica particle so as to render it less sorptive of the materials from the insect's body and less abrasive to the insect's cuticle.

I have discovered that silica powders useful in the control of crawling insects can be made substantially dustless without impairing their activity against crawling insects, by combining the finely divided silica with an alkylene hydroxy compound of the class consisting of lower glycols, lower polyglycols and their ethers, in sufficient amount to reduce the dustiness of the materials but insufficient to cause caking of the material in containers and consequent loss of their basic particulate structure.

The silicas which are useful in this work include not only the very special silica aerogel coated with ammonia fluosilicate and sold under the trade name Dri-Die 67 but also include the conventional finely divided silica gels and silica aerogels such as are sold under the trade names Santocel, Cab-O-Sil, H-Sil and Quso. In general, I can use any silica with an average particle size in the 5 micron or lower range and the typical sorptive powers of silica gels and silica aerogels.

These finely divided silicas are preferably combined with a minor percentage of synergized pyrethrins. The synergized pyrethrins give the composition a faster insect knockdown than the silica alone, and enhance the effectiveness of the overall composition. Generally it is desired to have, in the finished composition, of the order of .05 to .2% of pyrethrins with about 5 to 10 times its weight of a synergist such as piperonyl butoxide (see Wachs et al. U.S.P. 2,878,266). The pyrethrins are genmixed with inerts such as petroleum distillate, being generally available in this form on the market.

The addant used for admixture with the silica may be any of the lower alkylene glycols, polyglycols and glycol ethers. I have successfully used materials in which the individual glycol chains have had 2, 3 and 4 carbon atoms. Compounds which have been successively used include ethylene glycol, propylene glycol, butylene glycol, the butyl ether of ethylene glycol, butoxypolypropylene glycol (Crag Fly Repellant) and various polyethylene and polypropylene glycols, from dialkylene glycol to polyglycols with molecular weights in the thousands, such as the Carbowaxes. All of them reduce the dustiness of the silicas even when added in small amounts. However, it generally takes about 30 to 35% of these materials, based on the total weight of the composition, to produce a material which is satisfactory. In general the products become too sticky when the hydroxy compound exceeds about 60 to 70% of the weight of the total composition, depending again on the nature of the addant; beyond this point, the compositions lose their particulate structure, either on mixing or storage.

It is desirable, moreover, that the addant should not have substantial volatility under the conditions of use. While the most volatile addants of the indicated class give excellent results, the desired characteristics are lost as they evaporate. Hence, in the preferred compositions according to my invention, the desired addant should be substantially non-volatile at ordinary room temperature. However, it should be noted that the silicas adsorb these materials strongly so that even as volatile a material as the butyl ether of the ethylene glycol is effective for a full week after application.

In the following examples (in which all percentages are by weight), all formulations were prepared by dry mixing the ingredients. Where the addants were liquids, they were rapidly sorbed onto the silica gel and in every case the resultant materials were dry powders. The tests used were the standard tests devised by Samuel C. Billings of the United States Department of Agriculture, in which adult male German roaches (*Blatella germanica*) were used as the test insect. Three and three-quarter inch plywood panels were used as the test surface. Two hundred milligrams of each of the products to be tested was applied to each panel and two tests were made of each formulation. A treated panel, treated surface up, was placed in a crystallizing dish 7½ inches in diameter and 4 inches deep and covered with an untreated panel, separating the two by ³⁄₁₆" spacers at the corners. Twenty male German roaches were placed in each crystallizing dish. A watering device comprising a 50 ml. beaker filled with water and inverted over a Syracuse watch glass having a roll of dental cotton around the inside circumference was placed on the top of the upper panel. Food (Ralston Purina Laboratory Chow Checkers) was placed around the bottom of the crystallizing dish outside of the plywood panels. The crystallizing dishes were maintained at room conditions of temperature and humidity. Mortality counts were made as indicated below. Fresh cockroaches were put in at the beginning of each week.

As a control, a composition was used comprising 98.2% of the coated silica aerogel known as Dri-Die with 1% of piperonyl butoxide, 0.1% pyrethrins and the balance kerosene. The following results were obtained on the test:

| Deposit Age (weeks) | Avg. Knockdown and Kill (percent) after— | | | | | | |
|---|---|---|---|---|---|---|---|
| | 1 day | 2 days | 3 days | 4 days | 5 days | 6 days | 7 days |
| 0 | 98 | 98 | 98 | 100 | 100 | 100 | 100 |
| 1 | 62 | 68 | 70 | 72 | 78 | 85 | 85 |
| 2 | 68 | 68 | 68 | 72 | 75 | 75 | 75 |
| 3 | 12 | 15 | 18 | 18 | 18 | 18 | 18 |

It will be noted that very effective control is obtained the first week with reasonably good control the second and third weeks with control ineffective in the 4th week. It is believed that this is due to the fact that the materials have much greater affinity for the insects' bodies than for the treated surfaces. As a result, the material is dragged away from the surface fairly rapidly. This is borne out by the results with a straight silica powder—Dri-Die 67.

| Deposit Age (weeks) | Avg. Knockdown and Kill (percent) after— | | | | | | |
|---|---|---|---|---|---|---|---|
| | 1 day | 2 days | 3 days | 4 days | 5 days | 6 days | 7 days |
| 0 | 48 | 58 | 65 | 65 | 65 | 68 | 70 |
| 1 | 40 | 65 | 72 | 72 | 72 | 72 | 75 |
| 2 | 0 | 0 | 0 | 0 | 0 | 0 | 0 |
| 3 | 2 | 5 | 5 | 5 | 5 | 5 | 5 |

It will be noted that the material disappears after two weeks.

When formulations are made in accordance with my invention, however, effective knockdown and kill is obtained for longer periods of time. Note the results in the following examples:

*Example 1*

| | Percent |
|---|---|
| Dri-Die 67 | 49.5 |
| Butoxypolypropylene glycol | 47.5 |
| Pyrethrins | 0.1 |
| Butoxide | 1.0 |
| Kerosene | Balance |

| Deposit Age (weeks) | Avg. Knockdown and Kill (percent) after— | | | | | | |
|---|---|---|---|---|---|---|---|
| | 1 day | 2 days | 3 days | 4 days | 5 days | 6 days | 7 days |
| 0 | 100 | 100 | 100 | 100 | 100 | 100 | 100 |
| 1 | 100 | 100 | 100 | 100 | 100 | 100 | 100 |
| 2 | 100 | 100 | 100 | 100 | 100 | 100 | 100 |
| 3 | 85 | 85 | 98 | 98 | 98 | 98 | 98 |

*Example 2*

| | Percent |
|---|---|
| Dri-Die | 49.5 |
| Propylene glycol | 47.5 |
| Pyrethrins | 0.1 |
| Butoxide | 1.0 |
| Kerosene | Balance |

| Deposit Age (weeks) | Avg. Knockdown and Kill (percent) after— | | | | | | |
|---|---|---|---|---|---|---|---|
| | 1 day | 2 days | 3 days | 4 days | 5 days | 6 days | 7 days |
| 0 | 98 | 100 | 100 | 100 | 100 | 100 | 100 |
| 1 | 98 | 100 | 100 | 100 | 100 | 100 | 100 |
| 2 | 100 | 100 | 100 | 100 | 100 | 100 | 100 |
| 3 | 100 | 100 | 100 | 100 | 100 | 100 | 100 |

*Example 3*

| | Percent |
|---|---|
| Dri-Die | 49.5 |
| Mono-butyl ether of ethylene glycol | 47.5 |
| Pyrethrins | 0.1 |
| Butoxide | 1.0 |
| Kerosene | Balance |

| Deposit Age (weeks) | Avg. Knockdown and Kill (percent) after— | | | | | | |
|---|---|---|---|---|---|---|---|
| | 1 day | 2 days | 3 days | 4 days | 5 days | 6 days | 7 days |
| 0 | 100 | 100 | 100 | 100 | 100 | 100 | 100 |
| 1 | 95 | 95 | 95 | 95 | 98 | 98 | 98 |
| 2 | 70 | 72 | 75 | 78 | 78 | 78 | 78 |
| 3 | 40 | 42 | 42 | 42 | 42 | 45 | 48 |

*Example 4*

| | Percent |
|---|---|
| Dri-Die | 49.5 |
| Carbowax 1000 (polyethylene glycol molecular wt. 1000) | 47.5 |
| Pyrethrins | 0.1 |
| Butoxide | 1.0 |
| Kerosene | Balance |

| Deposit Age (weeks) | Avg. Knockdown and Kill (percent) after— | | | | | | |
|---|---|---|---|---|---|---|---|
| | 1 day | 2 days | 3 days | 4 days | 5 days | 6 days | 7 days |
| 0 | 100 | 100 | 100 | 100 | 100 | 100 | 100 |
| 1 | 100 | 100 | 100 | 100 | 100 | 100 | 100 |
| 2 | 100 | 100 | 100 | 100 | 100 | 100 | 100 |
| 3 | 100 | 100 | 100 | 100 | 100 | 100 | 100 |

*Example 5*

| | Percent |
|---|---|
| Dri-Die | 49.5 |
| Carbowax 4000 | 47.5 |
| Pyrethrins | 0.1 |
| Butoxide | 1.0 |
| Kerosene | Balance |

| Deposit Age (weeks) | Avg. Knockdown and Kill (percent) after— | | | | | | |
|---|---|---|---|---|---|---|---|
| | 1 day | 2 days | 3 days | 4 days | 5 days | 6 days | 7 days |
| 0 | 100 | 100 | 100 | 100 | 100 | 100 | 100 |
| 1 | 100 | 100 | 100 | 100 | 100 | 100 | 100 |
| 2 | 90 | 92 | 92 | 92 | 92 | 92 | 92 |
| 3 | 58 | 98 | 98 | 98 | 98 | 98 | 98 |

*Example 6*

| | Percent |
|---|---|
| Dri-Die | 49.5 |
| Carbowax 200 | 47.5 |
| Pyrethrins | 0.1 |
| Butoxide | 1.0 |
| Kerosene | Balance |

| Deposit Age (weeks) | Avg. Knockdown and Kill (percent) after— | | | | | | |
|---|---|---|---|---|---|---|---|
| | 1 day | 2 days | 3 days | 4 days | 5 days | 6 days | 7 days |
| 0 | 100 | 100 | 100 | 100 | 100 | 100 | 100 |
| 1 | 100 | 100 | 100 | 100 | 100 | 100 | 100 |
| 2 | 95 | 95 | 100 | 100 | 100 | 100 | 100 |
| 3 | 100 | 100 | 100 | 100 | 100 | 100 | 100 |

Note that in Example 3 when the relatively volatile butyl ether of ethylene glycol is used, the effectiveness tails off, although not quite as rapidly as in Formulation A of the prior art.

Similar results are obtained where other insecticides are added to the material. I have used, for example, Sevin (1 naphthyl N-methylcarbamate) and chlordane in the amounts of 5 to 10% without noting any differences in effective utility of the materials. As indicated above, effective results are obtained with other silicas. I have directly substituted other silica gel sold under the trade names Cab-O-Sil and Hi-Sil in the formula of Example 1 with comparable results, have used other silica gels and silica aerogels in essentially similar formulae without marked differences in end results, and have successfully replaced a large part of the silica gel with finely divided highly sorptive natural silicas such as diatomaceous earths (e.g., Celite 209).

Obviously the examples disclosed above can be multiplied indefinitely without departing from the scope of the invention as defined in the claims.

What is claimed is:

1. A powder composition for killing crawling insects containing as essential ingredients a finely divided highly sorptive silica with an average particle size not in excess of five microns and from about 35 to 70%, based on the total composition, of a glycol selected from the group consisting of lower alkylene glycols, poly(lower alkylene glycols), lower alkyl ethers of lower alkylene glycols, and lower alkyl ethers of poly(lower alkylene glycols) to materially reduce the dustiness of the silica without changing the essential particulate character of the composition.

2. The composition of claim 1 which additionally contains 0.05–0.2% of synergized pyrethrins.

3. A powder composition for killing crawling insects containing as essential ingredients a highly sorptive silica gel coated with about 5% of ammonium fluosilicate and with an average particle size of about 3 microns, and from about 35 to 70%, based on the total composition, of a glycol selected from the group consisting of glycols, poly(lower alkylene glycols), lower alkyl ethers of lower alkylene glycols, and lower alkyl ethers of poly(lower alkylene glycols) to materially reduce the dustiness of the silica without changing the essential particulate character of the composition.

4. The composition of claim 1 in which the glycol is butoxy polypropylene glycol.

5. The method of combatting crawling insects which comprises applying to the infected locus an effective concentration of the composition of claim 1.

References Cited by the Examiner

UNITED STATES PATENTS

| | | | |
|---|---|---|---|
| 2,832,716 | 4/1958 | Cassil et al. | 167—42 |
| 2,894,870 | 7/1959 | Wachs | 167—24 |
| 2,967,127 | 1/1961 | Sawyer | 167—42 |

OTHER REFERENCES

Ebeling, Journal of Economic Entomology, vol. 53, No. 3, June 1960, pages 475 and 476.

Frear, Pesticide Handbook (1952), College Science Publishers, State College Pa., pages 32 and 159–161.

Mallis, Handbook of Pest Control, 35d, Ed., Mac Nair-Dorland Co. (1960), New York, New York, pp. 168–170 and 1028–1031.

JULIAN S. LEVITT, *Primary Examiner.*